United States Patent
Meacham et al.

(10) Patent No.: US 9,297,438 B2
(45) Date of Patent: Mar. 29, 2016

(54) THREE PARAMETER DAMPER ANISOTROPIC VIBRATION ISOLATION MOUNTING ASSEMBLY

(75) Inventors: Walter Lee Meacham, Phoenix, AZ (US); Eric Bridges, Tempe, AZ (US); Alan Margolis, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 684 days.

(21) Appl. No.: 13/358,239

(22) Filed: Jan. 25, 2012

(65) Prior Publication Data

US 2013/0186105 A1    Jul. 25, 2013

(51) Int. Cl.
F01D 25/28 (2006.01)
F16F 15/02 (2006.01)
F16F 15/023 (2006.01)
F02C 7/20 (2006.01)

(52) U.S. Cl.
CPC .............. *F16F 15/023* (2013.01); *F01D 25/28* (2013.01); *F05D 2260/96* (2013.01); *Y10T 29/49826* (2015.01)

(58) Field of Classification Search
CPC ........ F01D 25/28; F16F 15/02; F16F 15/023; F05D 2260/96; F02C 7/20
USPC ..................... 60/796–799, 415, 416; 267/136
See application file for complete search history.

(56) References Cited

U.S. PATENT DOCUMENTS

| | | |
|---|---|---|
| 2,967,739 A | 1/1961 | Hoffmann |
| 3,015,523 A | 1/1962 | Semar |
| 3,679,272 A | 7/1972 | Costa et al. |
| 3,705,775 A | 12/1972 | Rioux |
| 3,809,340 A | 5/1974 | Dolgy et al. |
| 3,813,776 A | 6/1974 | Frederickson et al. |
| 4,214,796 A | 7/1980 | Monzel et al. |
| 4,370,094 A | 1/1983 | Ambrosch et al. |
| 4,668,108 A | 5/1987 | McHugh |
| 4,872,767 A | 10/1989 | Knapp |
| 4,952,076 A | 8/1990 | Wiley, III et al. |
| 5,028,001 A | 7/1991 | Bender et al. |

(Continued)

FOREIGN PATENT DOCUMENTS

| | | |
|---|---|---|
| JP | 8326557 A | 12/1996 |
| WO | 2005095822 A1 | 10/2005 |

OTHER PUBLICATIONS

GB Office Action, GB 1216644.3 dated Jan. 8, 2013.

(Continued)

*Primary Examiner* — William H Rodriguez
*Assistant Examiner* — Eric Linderman
(74) *Attorney, Agent, or Firm* — Ingrassia Fisher & Lorenz, P.C.

(57) ABSTRACT

An anisotropic vibration isolation mounting assembly includes at least two three-parameter vibration isolators each having a first end configured for attachment to a rotating member assembly or a rotating member assembly housing and each having a second, opposing end configured for attachment to the rotating member assembly housing where the first end is configured for attachment to the rotating member assembly or to a system interface member where the first member is configured for attachment to the rotating member assembly housing. The at least two three-parameter vibration isolators are tuned anisotropically to minimize the transmission of vibrations during operation of the rotating machine.

18 Claims, 13 Drawing Sheets

(56) References Cited

U.S. PATENT DOCUMENTS

| | | | |
|---|---|---|---|
| 5,044,781 A | 9/1991 | Werner | |
| 5,065,959 A | 11/1991 | Bhatia et al. | |
| 5,088,840 A | 2/1992 | Radtke | |
| 5,284,011 A * | 2/1994 | Von Benken | 60/796 |
| 5,305,981 A | 4/1994 | Cunningham et al. | |
| 5,332,070 A * | 7/1994 | Davis et al. | 188/298 |
| 5,421,655 A | 6/1995 | Ide et al. | |
| 5,484,120 A | 1/1996 | Blakeley et al. | |
| 5,501,531 A | 3/1996 | Hamaekers | |
| 5,531,522 A | 7/1996 | Ide et al. | |
| 5,603,574 A | 2/1997 | Ide et al. | |
| 5,613,781 A | 3/1997 | Kuzdzal et al. | |
| 5,810,319 A | 9/1998 | von Flotow et al. | |
| 5,860,623 A * | 1/1999 | Dunstan | B64D 27/18 244/54 |
| 5,947,240 A | 9/1999 | Davis et al. | |
| 5,947,457 A | 9/1999 | Swanson et al. | |
| 6,002,778 A | 12/1999 | Rossetti et al. | |
| 6,109,022 A * | 8/2000 | Allen et al. | 60/223 |
| 6,155,720 A | 12/2000 | Battig | |
| 6,325,327 B1 | 12/2001 | Zoppitelli et al. | |
| 6,325,546 B1 | 12/2001 | Storace | |
| 6,328,293 B1 * | 12/2001 | Olsen | 267/140.11 |
| 6,394,387 B1 | 5/2002 | Mitrovic | |
| 6,499,209 B1 | 12/2002 | Landin et al. | |
| 6,682,219 B2 | 1/2004 | Alam et al. | |
| 6,789,998 B2 * | 9/2004 | Chen et al. | 415/1 |
| 6,806,604 B2 | 10/2004 | Werfel et al. | |
| 6,817,771 B2 * | 11/2004 | Campbell | F16F 7/104 384/535 |
| 6,883,967 B2 | 4/2005 | Robb et al. | |
| 6,935,591 B2 | 8/2005 | Udall | |
| 7,066,651 B2 | 6/2006 | Nicholas et al. | |
| 7,093,806 B2 | 8/2006 | Osterberg | |
| 7,121,729 B2 | 10/2006 | Davis et al. | |
| 7,182,188 B2 | 2/2007 | Ruebsamen | |
| 7,384,199 B2 | 6/2008 | Allmon et al. | |
| 7,445,094 B1 * | 11/2008 | Henderson et al. | 188/267 |
| 7,524,112 B2 | 4/2009 | Gerez et al. | |
| 7,625,121 B2 | 12/2009 | Pettinato et al. | |
| 7,631,839 B1 | 12/2009 | Duncan et al. | |
| 7,731,426 B2 | 6/2010 | Meacham et al. | |
| 7,845,158 B2 | 12/2010 | Udall | |
| 7,878,448 B2 | 2/2011 | Olsen et al. | |
| 7,950,633 B2 | 5/2011 | Hiley et al. | |
| 8,001,764 B2 | 8/2011 | Parks et al. | |
| 8,002,233 B2 * | 8/2011 | McMickell et al. | 248/638 |
| 8,256,750 B2 | 9/2012 | Cottrell et al. | |
| 8,371,534 B1 * | 2/2013 | Goodzeit et al. | 244/173.2 |
| 8,794,912 B2 * | 8/2014 | Nilsson et al. | 415/191 |
| 9,046,001 B2 * | 6/2015 | Hindle | F01D 25/164 |
| 9,103,403 B2 * | 8/2015 | Hadden | F16F 15/06 |
| 2003/0132077 A1 * | 7/2003 | Davis | 188/380 |
| 2004/0004161 A1 | 1/2004 | Osterberg | |
| 2004/0245403 A1 | 12/2004 | Osterberg | |
| 2005/0217954 A1 * | 10/2005 | Hindle et al. | 188/298 |
| 2006/0204153 A1 | 9/2006 | Alam et al. | |
| 2008/0148708 A1 | 6/2008 | Chou et al. | |
| 2009/0020381 A1 * | 1/2009 | Hindle et al. | 188/267 |
| 2009/0110572 A1 | 4/2009 | Meacham et al. | |
| 2009/0148271 A1 | 6/2009 | Alvanos et al. | |
| 2009/0183512 A1 | 7/2009 | Suciu et al. | |
| 2010/0207007 A1 * | 8/2010 | Cottrell et al. | 248/638 |
| 2011/0318162 A1 * | 12/2011 | Cottrell et al. | 415/13 |
| 2013/0051981 A1 * | 2/2013 | Hindle et al. | 415/119 |
| 2013/0051982 A1 * | 2/2013 | Hindle et al. | 415/119 |
| 2013/0067931 A1 * | 3/2013 | Hindle et al. | 60/797 |
| 2013/0186105 A1 * | 7/2013 | Meacham et al. | 60/797 |

OTHER PUBLICATIONS

USPTO Office Action, Notification Date Jun. 10, 2014; U.S. Appl. No. 13/220,081.

USPTO Office Action, Notification Date Jun. 10, 2014; U.S. Appl. No. 13/239,115.

USPTO Office Action, Notification Date Apr. 30, 2014; U.S. Appl. No. 13/219,287.

USPTO Final Office Action, Notification Date Nov. 6, 2014; U.S. Appl. No. 13/239,115.

USPTO Notice of Allowance, Notification Date Nov. 24, 2014; U.S. Appl. No. 13/219,287.

USPTO Office Action, Notification Date Aug. 25, 2014; U.S. Appl. No. 13/219,287.

USPTO Office Action, Notification Date Feb. 10, 2015; U.S. Appl. No. 13/220,081.

USPTO Communication for U.S. Appl. No. 13/239,115; Notification date Jul. 29, 2015.

EP Search Report for Application No. 12181431.3, dated for May 19, 2015.

EP Examination Report for Application No. 12181431.3, dated for Jun. 12, 2015.

* cited by examiner

THREE PARAMETER DAMPER ANISOTROPIC VIBRATION ISOLATION MOUNTING ASSEMBLY

STATEMENT REGARDING FEDERALLY SPONSORED RESEARCH OR DEVELOPMENT

This invention was made with Government support under W911W6-10-2-0008 awarded by the U.S. Army Aviation Applied Technology Directorate. The Government has certain rights in the invention.

TECHNICAL FIELD

Embodiments of the subject matter described herein relate generally to mounting assemblies. More particularly, embodiments of the subject matter relate to anisotropic vibration isolation assemblies and mounting assemblies for rotating machinery.

BACKGROUND

Vibrations are caused in the normal operation of various types of rotating machinery, for example aircraft turbine engines and other turbomachinery, rotating devices deployed on-board satellite and other spacecraft for attitude adjustment purposes, such as control moment gyroscopes and reaction wheels, automobile turbochargers, generators and pumps, and other rotating machinery. When machinery rotates, there can be loads or forces created due to imbalances in the rotation, referred to as synchronous responses. These forces can be amplified when the rotating machinery transitions a critical angular velocity. In addition, rotating machinery can experience non-synchronous responses due to de-stabilizing forces, such as a change in direction of travel (directional acceleration) or jarring forces such as air turbulence or uneven pavement, among others. These forces (synchronous and non-synchronous) can result in vibration of the overall system associated with the rotating machinery. Such vibrations have a detrimental effect on both the performance of the machinery and the comfort of persons who may be present on-board a vehicle associated with the rotating machinery (e.g., airplane, helicopter, automobile, etc.).

Jet engines, particularly turbofan engines, contain a number of components that rotate about a central axis. Because vibrations can introduce eccentricity in the rotation, vibrations can degrade the performance of the engine. This degraded performance can be manifest as a decrease in thrust, which can, in turn, increase the length of a flight as well as the fuel required. The vibrations also can travel through the frame of the aircraft to compartments containing passengers and operators. While not harmful, vibrations can be an unpleasant aspect of travel for the occupants.

The most common approach to reducing the impact of vibrations on rotating machinery components is to provide a squeeze film damper (SFD). Typically, a bearing rotatably supports a shaft in the machinery, such as a rotor shaft in the example of a jet engine. The bearing is, in turn, supported by a SFD. The SFD damps vibrations from the rotor by providing a constant flow of oil to an annular chamber surrounding the bearing. The oil film can be squeezed through one or more exit channels when the bearing moves from its central position as a result of rotor shaft eccentricity. SFDs are not ideal because they offer sub-optimal damping characteristics while still requiring oil and maintenance. Additionally, the use of SFDs requires tolerancing for positioning of the rotor shaft and bearings that can introduce variations in the center of rotation of the shaft, further reducing performance.

Additionally, many common approaches to reducing the impact of vibrations on rotating machinery provide isotropic vibrational damping support. That is, the mounting assembly includes supports and dampers configured to provide the same degree of damping support in all directions relative to the rotation of the machinery. Referring to FIG. 1, an exemplary isotropic vibration mounting assembly is shown including three identically configured, generic vibration isolators 10. The vibration isolators 10 are coupled with a circular structural housing member 12, for example, a bearing housing, that houses a bearing assembly and a rotating member, for example, a rotor shaft (not shown), with the axis of rotation passing orthogonally through the intersection of the x- and y-axes. Each vibration isolator 10 is positioned exactly 120 degrees apart from one another along the circular structural housing member 12, as indicated by angles θ, thereby providing identical levels of vibration isolation and damping support in the x-direction and the y-direction to the structural housing member 12, and consequently the rotating member housed therein. Isotropic support systems, however, lack the ability to provide effective vibration isolation at the lowest frequencies that are typically associated with noise generation in the passenger cabin of an associated vehicle. Furthermore, isotropic support systems lack the ability to tune support with regard to expected directional accelerations in the system.

BRIEF SUMMARY

Anisotropic vibration isolation mounting assemblies for isolating vibrations in a rotating machine are provided. In one embodiment, the mounting assembly includes at least two three-parameter vibration isolators each having a first end and a second end, each first end configured for attachment to the rotating member assembly or the rotating member assembly housing, each second end configured for attachment to the rotating member assembly housing when the first end is configured for attachment to the rotating member assembly or to the system interface member when the first member is configured for attachment to the rotating member assembly housing. The at least two three-parameter vibration isolators are tuned anisotropically to minimize transmission of vibrations during operation of the rotating machine.

In another embodiment, disclosed is a gas turbine engine assembly configured to be mounted to an airframe. The gas turbine engine assembly includes a gas turbine engine, the gas turbine engine comprising a rotor bearing assembly, a rotor bearing housing, and an engine casing. The assembly further includes at least three three-parameter vibration isolators each having a first end and a second end, each first end configured for attachment to the rotor bearing assembly or the rotor bearing housing, each second end configured for attachment to the rotor bearing housing when the first end is configured for attachment to the rotor bearing assembly or to the engine casing when the first member is configured for attachment to the rotor bearing housing. The at least three three-parameter vibration isolators are tuned anisotropically to minimize transmission of vibrations from the gas turbine engine to the airframe during operation of the gas turbine engine.

In yet another embodiment, a method is disclosed for producing an anisotropic vibration isolation mounting assembly. The method includes providing a rotating machine having operational characteristics, attaching a plurality of three-parameter vibration isolators to the rotating machine at different locations on the rotating machine, and independently and anisotropically tuning each one of the plurality of three-parameter vibration isolators to impart vibration isolation to the rotating machine based upon the operational characteristics of the rotating machine.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. While certain features are discussed with reference to exemplary embodiments, any one of numerous other embodiments of a mounting assembly may be implemented as well.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures, and wherein:

DETAILED DESCRIPTION

Figure 1:
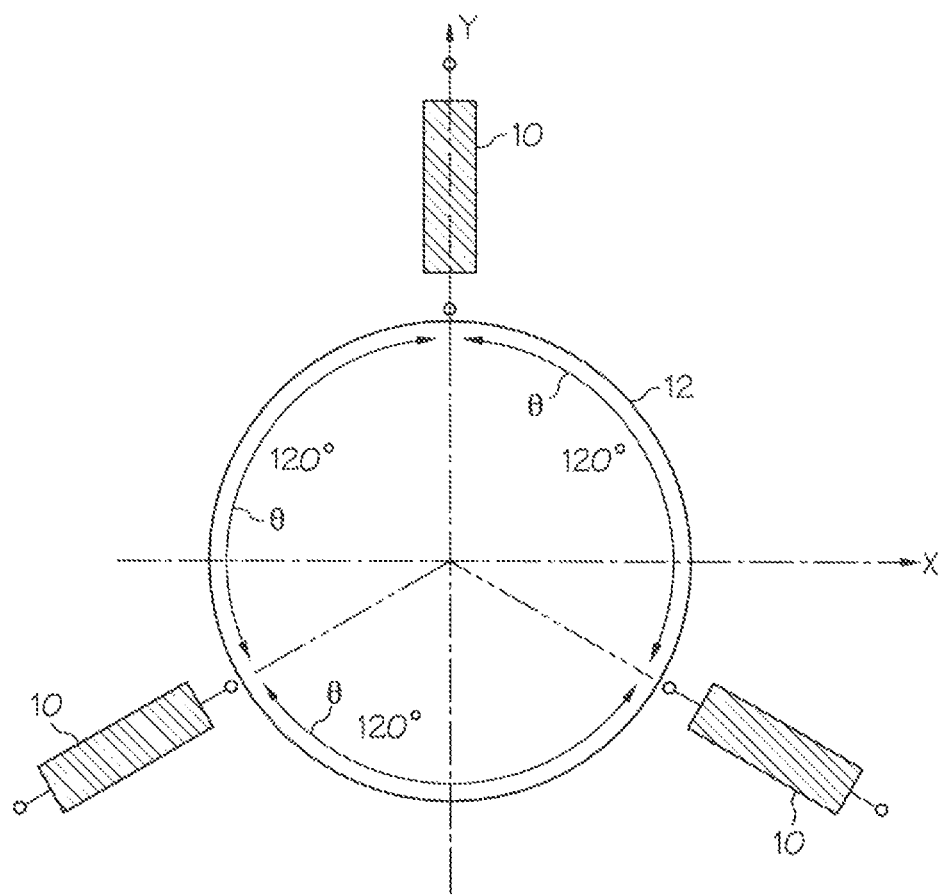
FIG. 1 is an exemplary isotropic vibration mounting assembly previously known in the art.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the figures show one exemplary arrangement of elements, additional intervening elements, devices, features, or components may be present in an embodiment of the disclosed subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition, for example vibration, it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "front", "back", "rear", "left", "right", "center", "side", "outer", and "inner" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated or explicitly stated.

Anisotropic vibration isolation mounting assemblies for isolating vibrations in a rotating machine are disclosed herein. A mounting assembly in accordance with the present disclosure may include one, two, three, four, or more individual vibration isolators configured for coupling anisotropically with the rotating machine to reduce vibration within an overall system associated with the rotating machine, for example and aircraft, helicopter, spacecraft, automobile, generator, pump, etc.

In one embodiment, a vibration isolator may be provided as a three-parameter axial damper. One example of a suitable three-parameter axial damper is the passive-mass damping D-STRUT™ vibration isolator, manufactured by Honeywell, Inc. of Morristown, N.J. The D-STRUT™ vibration isolator is a three-parameter vibration isolation system that mechanically acts like a first spring ($K_A$) in parallel with a second spring ($K_B$) in series with a damper ($C_A$.). The D-STRUT™ vibration isolator is disclosed in U.S. Pat. No. 5,332,070 entitled "Three Parameter Viscous Damper and Isolator" to Davis et al. (the contents of which are herein incorporated by reference in their entirety). The D-STRUT™ vibration isolator includes a hollow shaft and a piston that is configured to slidably move through the shaft. The piston includes a flange that extends radially from a midsection thereof. The flange has a top surface that is coupled to a first sealed bellows and a bottom surface that is coupled to a second sealed bellows. Each of the bellows has a chamber that is filled with fluid. Thus, when the piston moves axially through the shaft, fluid flows from one of the bellows chambers to the other.

Figure 2:
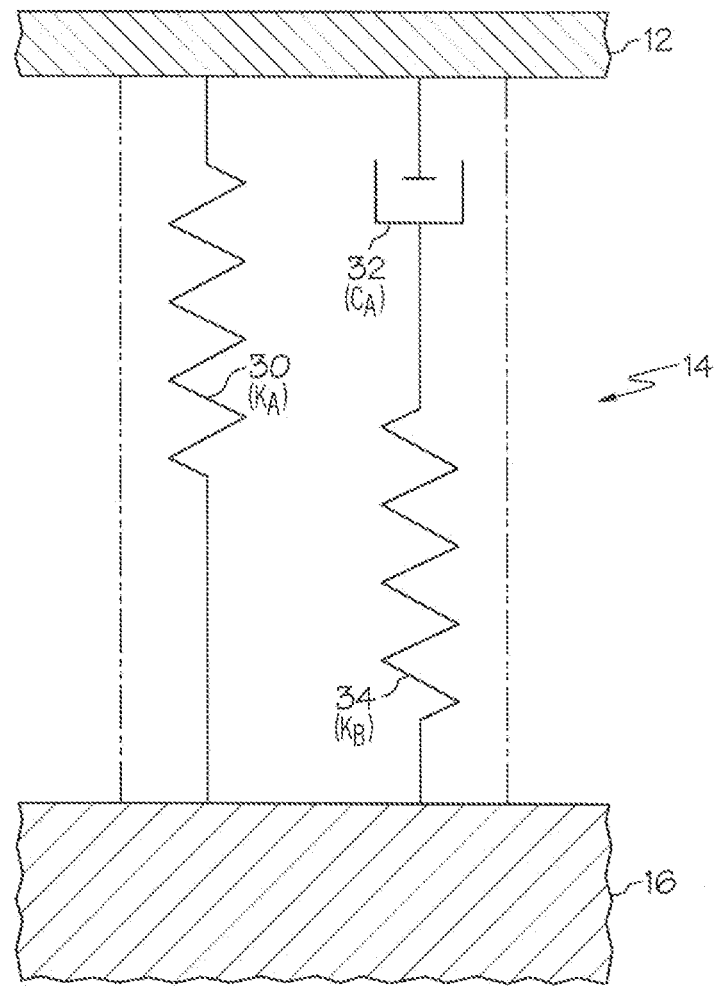
FIG. 2 is an illustration of the mechanical functioning of a three-parameter axial damper.

FIG. 2 is illustrative of the mechanical functioning of a three-parameter axial damper, such as the D-STRUT™ vibration isolator for example. As shown therein, the three-parameter vibration isolator 14 is employed between the structural housing member 12, for example, a bearing housing, and the overall system associated with the rotating machinery, depicted generally as system interface member 16, and is securely coupled to both the structural housing member 12 and the system interface member 16 by, for example, bolts (not shown) or other fastening components. The three-parameter vibration isolator 14 includes a primary spring 30 ($K_A$) in parallel with a series damper element 32 ($C_A$) and secondary stiffness element 34 ($K_B$), such as another spring. The spring element 30 makes the vibration isolator 14 softer than the structural housing member 12 and the system interface member 16. The primary spring 30 and the secondary stiffness element 34 maintain the vibration isolator 14 at a level of stiffness sufficient to inhibit communication of low frequency vibrational forces while the damper element 32 provides enough softness to inhibit communication of high frequency vibrational forces.

In another example, a suitable three-parameter axial damper is an active-passive Hybrid D-STRUT™ vibration isolator, manufactured by Honeywell, Inc. of Morristown, N.J. The Hybrid D-STRUT™ vibration isolator includes the passive-mass damping mechanism of the passive D-Strut™ vibration isolator and an active enhancement mechanism. The active enhancement mechanism enhances the force dissipation of the passive damping mechanism and includes an actuator mechanism which has a voice coil actuator system (such as a Lorentz force actuator) that can be tuned to damp a desired vibration. The Hybrid D-STRUT™ vibration isolator is disclosed in U.S. Pat. No. 6,003,849 entitled "Hybrid Isolator and Structural Control Actuator Strut" to Davis and Hyde (the contents of which are herein incorporated by reference in their entirety).

In another embodiment, a vibration isolator may be provided as other than a three-parameter axial damper. For example, suitable vibration isolators for use in accordance with embodiments of the present disclosure may alternatively or additionally include electrically controlled isolators or actively controlled dynamic actuators, or other vibrations isolators as are known in the art. These alternate vibration isolators have tunable parameters, and as such may be employed anisotropically as described herein.

Figure 3A:
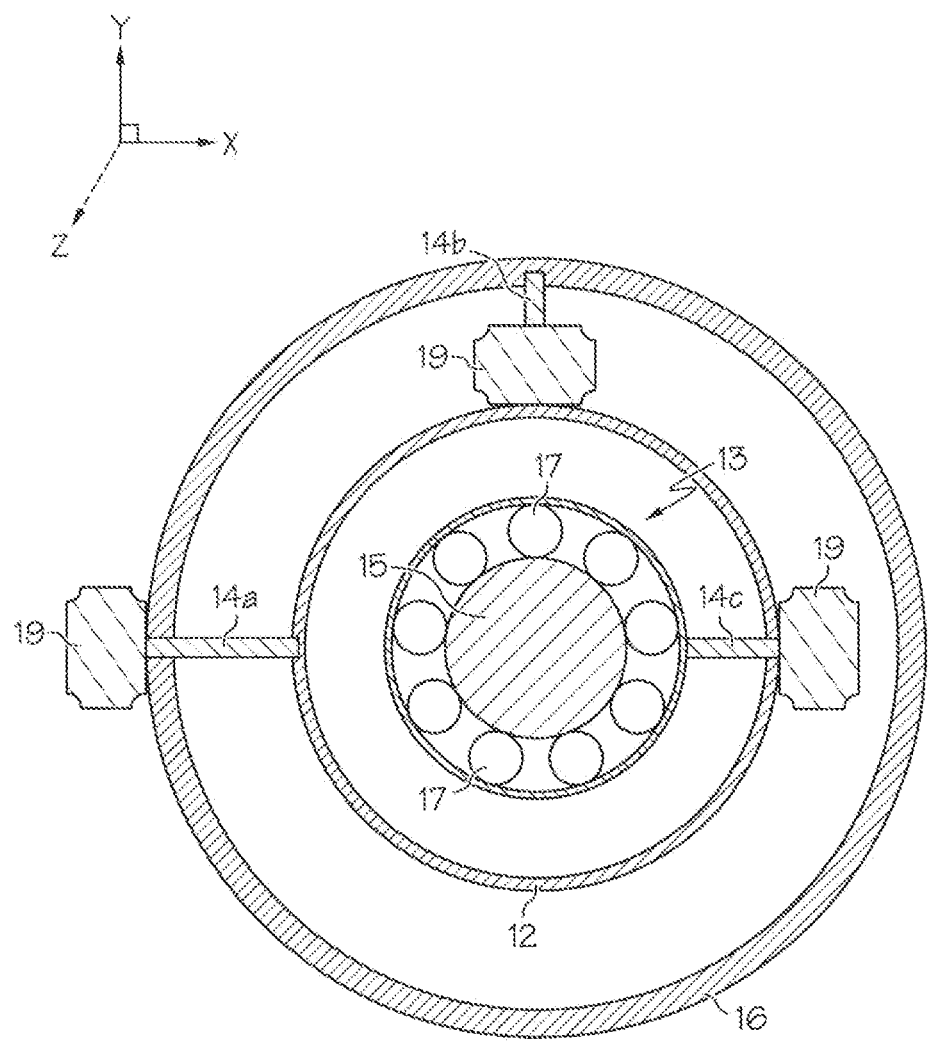
FIGS. 3a-3e are schematic diagrams illustrating exemplary, alternative mounting arrangements suitable for use in mechanically coupling a vibration isolator, such as a three-parameter axial damper, in a rotating machine.

FIG. 3a is a schematic diagram illustrating three alternative mounting arrangements suitable for use in mechanically coupling a vibration isolator, such as a three-parameter axial damper, in a rotating machine between the rotating member and the rest of the system. Each of vibration isolators 14a-14c are kinetically coupled between system interface member 16, which may be, for example, an engine case/housing, and a rotating member assembly 13, such as a rotor bearing assembly. Rotating member assembly 13 supports a rotating member 15, such as a rotatable shaft or spool, and is enclosed by a structural housing member 12. In the simplified schematic shown in FIG. 3a, rotating member assembly 13 is generically illustrated as consisting solely of ball bearings 17; however, it will be appreciated that rotating member assembly 13 may include any number and type of rotor bearings, including other types of rolling element bearings (e.g., roller bearings), oil journal bearings, oil floating ring bearings, air bearings, air foil bearings, gas bearings, magnetic bearings, and any number of additional structural elements supportive of or otherwise coupled to the rotating assembly bearings.

Three-parameter vibration isolators 14a-14c are circumferentially arranged or spaced around the rotational axis of rotating member assembly 13 and, more generally, the rotational axis of the rotor assembly. In preferred embodiments, vibration isolators 14a-14c assume the form of or include elongated struts, which extend radially in a radial configuration. Collectively, vibration isolators 14a-14c provide damping within a plane (the x-y plane) substantially orthogonal to the rotational axis of the rotor assembly and to the rotating member centerline (i.e., the z-axis).

The mounting arrangement of vibration isolator 14a includes a vibration isolator mounting member 19 coupled to the exterior surface of the bearing housing 12, with the vibration isolator 14a strut extending radially inwardly through bearing housing 12 to provide vibration damping directly to the bearing assembly 13 positioned centrally therein. The vibration isolator 14b includes a vibration isolator mounting member 19 coupled to the exterior surface of the bearing housing 12, with the vibration isolator 14b strut extending radially outwardly to provide vibration damping directly to the system interface member 16. As additionally shown in FIG. 3a, the vibration isolator 14c includes a vibration isolator mounting member 19 coupled to the exterior surface of the system interface member 16, with the vibration isolator 14c strut extending radially inwardly to provide vibration damping directly to the bearing housing 12. As discussed above, a mounting assembly in accordance with the present disclosure may include one, two, three, four, or more individual vibration isolators 14, and as such may include any combination of isolators mounted in any of the manners of vibration isolators 14a through 14c.

Figure 3B:
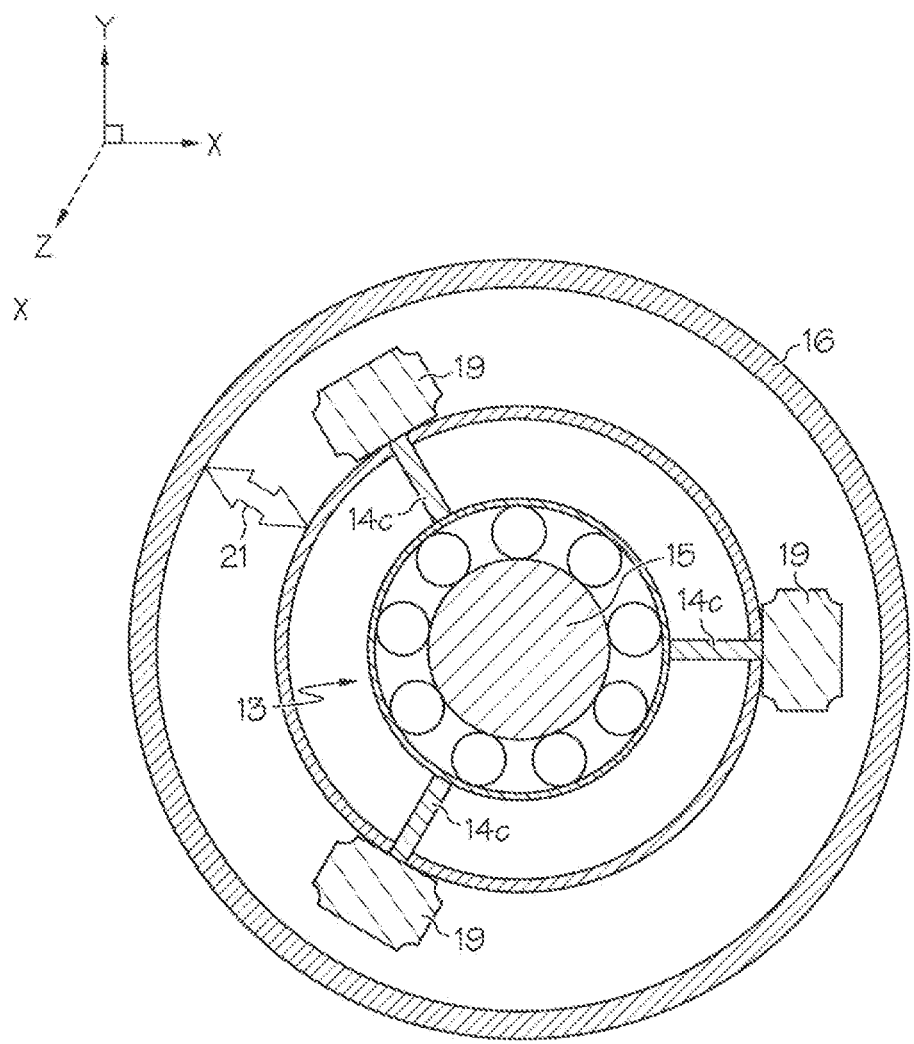
Figure 3C:
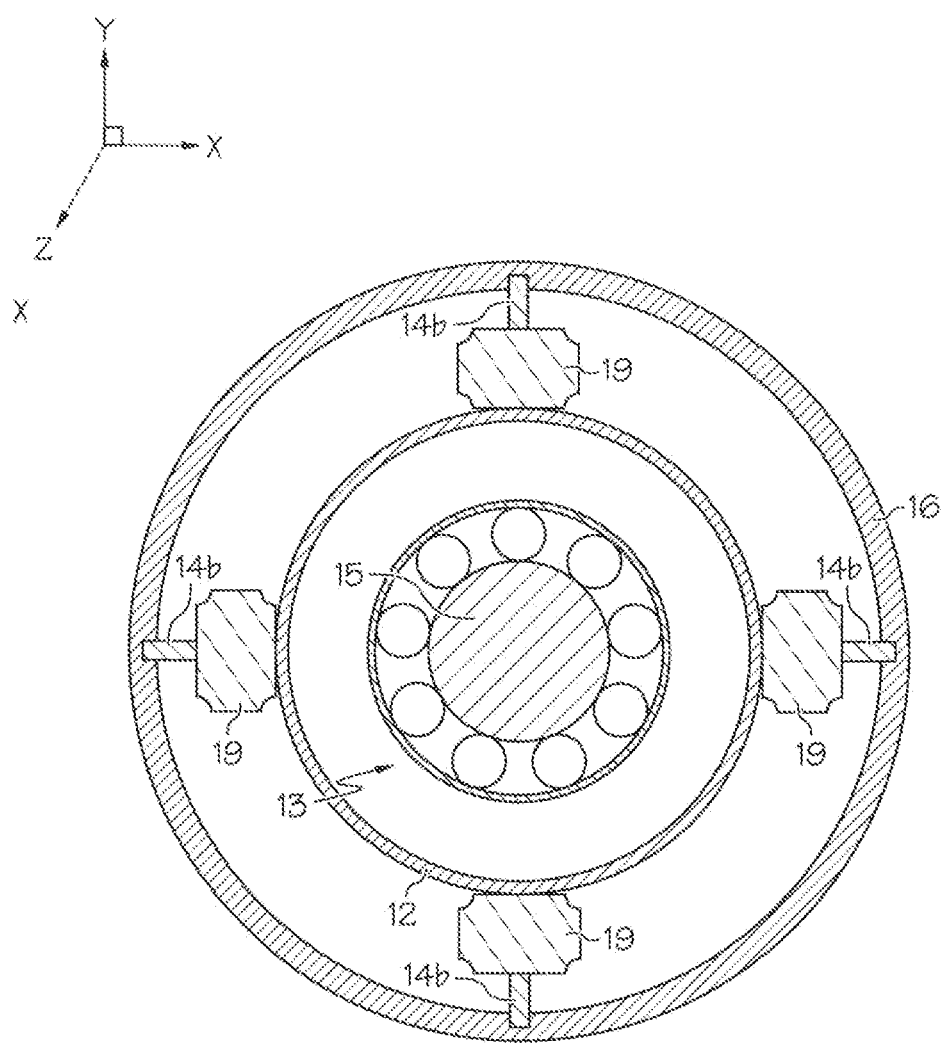
Figure 3D:
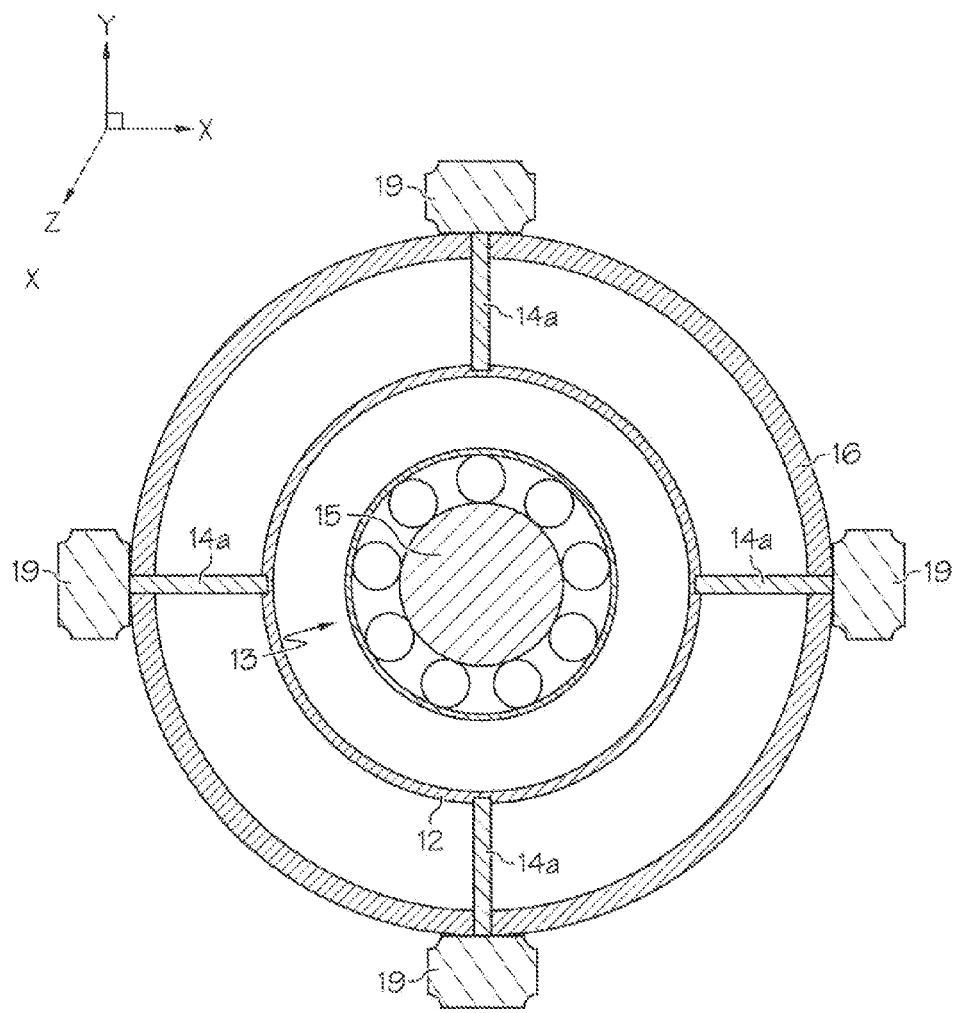
Figure 3E:
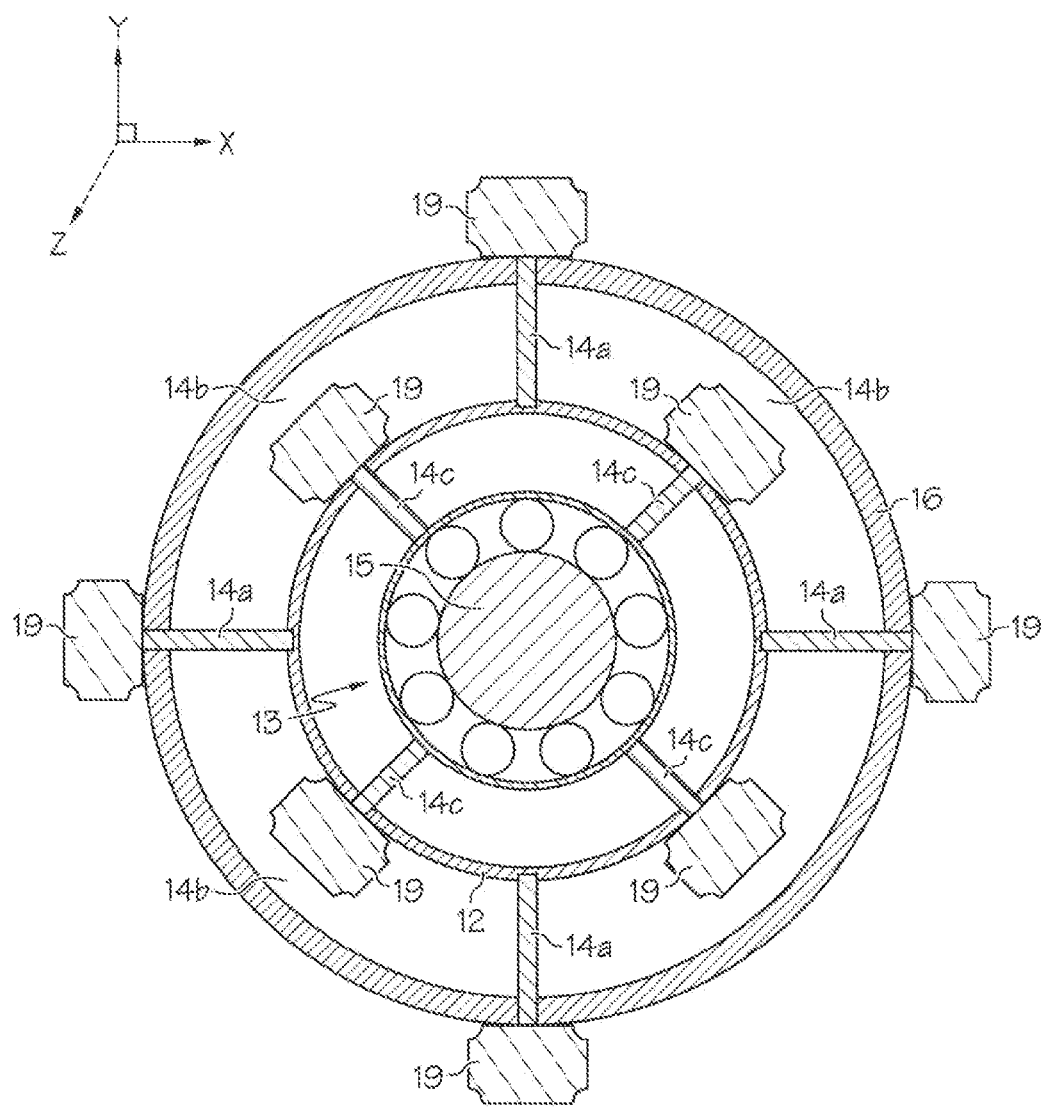

FIGS. 3b through 3e illustrate four exemplary arrangements of the numerous possible combinations of one, two, three, four, or more of vibration isolators 14a, 14b, and 14c. As shown in FIG. 3b, three vibration isolators 14c are shown mounted between the rotor bearing assembly 13 and the bearing housing 12, positioned generally equidistant from one another. This configuration may also include a rigid attachment member 21 or a plurality of rigid attachment members 21 to provide rigid support between the interface member 16 and the bearing housing 12. As shown in FIG. 3c, four vibration isolators 14b are shown mounted between the system interface member 16 and the bearing housing 12, positioned generally equidistant from one another. As shown in FIG. 3d, four vibration isolators 14c are shown mounted between the system interface member 16 and the bearing housing 12, positioned generally equidistant from one another. Furthermore, as shown in FIG. 3e, a total of eight vibration isolators, four vibration isolators 14a and four vibration isolators 14c, are shown mounted between the bearing housing 12 and the bearing assembly 13, positioned generally equidistant from one another. Numerous other configurations and combinations are possible.

Figure 4:
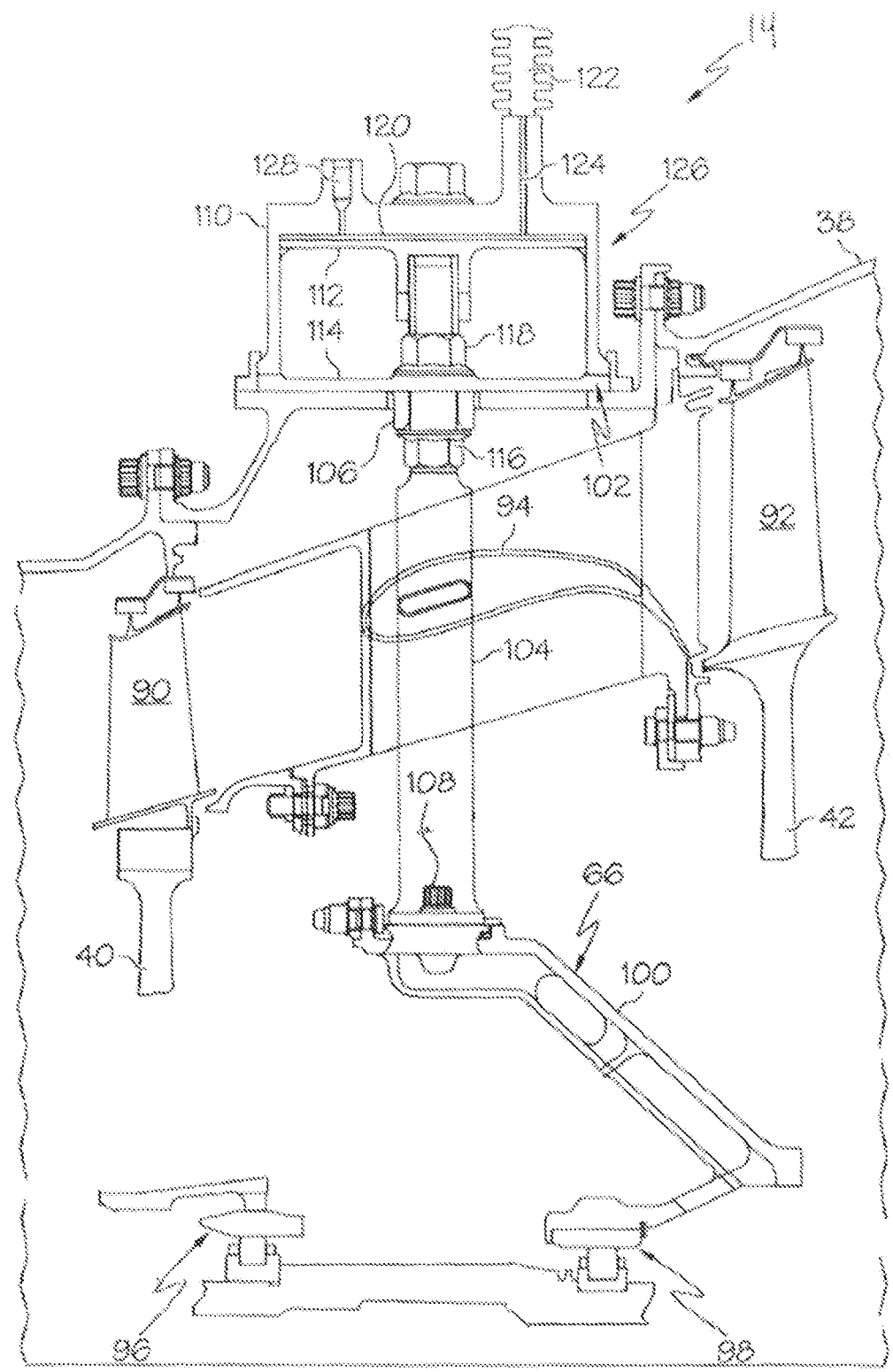
FIG. 4 is a cross-sectional view taken through a portion of a gas turbine engine (GTE) and illustrating one manner in which a three-parameter vibration isolator can be structurally implemented.

Three-parameter vibration isolators 14a-14c can be implemented in any manner and may include any number of structural elements providing the above-described three parameter functionality, including the above-described Honeywell D-STRUT™ implementations. In an exemplary embodiment, FIG. 4 is a cross-sectional view taken through a portion of gas turbine engine (GTE) 18 and illustrating one manner in which a three-parameter vibration isolator 14 can be structurally implemented. In addition to three-parameter vibration isolator 14, the illustrated portion of GTE 18 includes a first rotating blade 90 included within high pressure (HP) turbine 40, a second rotating blade 92 included within low pressure (LP) turbine 42, a stator vane 94 positioned between HP turbine 40 and LP turbine 42, and a rotor bearing assembly support 66. Rotor bearing assembly support 66 includes a first rotor bearing 96, a second rotor bearing 98, and a stationary bearing housing member 100 (e.g., a conical wall). Three-parameter vibration isolator 14 includes a main damper unit 102, which is mounted to the exterior of engine case 38; and an elongated strut 104, the outer radial end of which attaches to main damper unit 102 through a radial opening 106 provided in engine case 38. Strut 104 extends radially inward from main damper unit 102, through stator vane 94, and to bearing housing member 100. The inner radial end of strut 104 is affixed to bearing housing member 100 utilizing, for example, a plurality of bolts 108 or other such fasteners.

Main damper unit 102 includes a damper housing 110 containing first and second radially-compliant flexures 112 and 114. Flexure 114 is affixed to the outer end of strut 104 by way of a radial adjustment device 116, and flexure 112 is fixedly coupled to the outer end of strut 104 by a radial extension piece 118. Notably, radial adjustment device 116 enables the radial position of strut 104, and thus the radial position of rotor bearing assembly 66, to be fine-tuned after assembly of GTE 18 to provide centerline adjustment; i.e., precise centering of the rotor assembly spool. By way of this exemplary structural arrangement, flexures 112 and 114 are each mechanically coupled between strut 104 and damper housing 110 or, more generally, between rotor bearing assembly 66 and engine case 38. Flexure 112 cooperates with the interior of housing 110 to define a hydraulic chamber 120 within main damper unit 102, which is filled with a silicon oil or other suitable damping fluid. Hydraulic chamber 120 is fluidly coupled to a bellows 122 by way of a fluid conduit or channel 124. Collectively, hydraulic chamber 120, bellows 122, and conduit 124, along with the damping fluid contained therein, form a damper device 126. During operation of main damper unit 102, the geometry of hydraulic chamber 120 changes in conjunction with deflections of flexure 112, and hydraulic fluid flows between hydraulic chamber 120 and bellows 122 as required to accommodate such geometric changes. Damping is thus provided by viscous losses as the damping fluid is exchanged between hydraulic chamber 120 and bellows 122. Bellows 122 serves the function of supplying a pre-load pressure into the system, as well as serving as a thermal compensation device to accommodate volumetric changes in damping fluid. In further embodiments, bellows 122 may be replaced by a rigid damping fluid chamber, in which case damper device 126 may include an independent thermal compensation device (e.g., a spring-loaded piston) fluidly coupled to hydraulic chamber 120. Damper device 126 may be further equipped with include a fill port 128 to permit post-assembly filling of hydraulic chamber 120.

During operation of three-parameter vibration isolator 14, vibrations emitted from the rotor assembly are transmitted through rotor bearing support assembly 66, through radially-disposed strut 104, and to main damper unit 102. Main damper unit 102 servers as a three parameter device providing two vibration transmission paths to engine case 38. The first vibration transmission path extends from strut 104 through flexure 114 and to damper housing 110 and, therefore, to engine case 38. Vibrations traveling along this path are effectively shunted around flexure 112 and hydraulic chamber 120. Vibrations transmitted along this path are attenuated by deflection of flexure 114, which serves as the main spring and is wholly or predominately determinative the main spring rate $K_A$. The second vibration transmission path extends from strut 104, through flexure 112, through hydraulic chamber 120, and to damper housing 110. Vibrations transmitted along this path are thus attenuated both by deflection of flexure 112, which functions as the tuning spring, and by the corresponding displacement of damping fluid within damper device 126. Flexure 112 is a small contributor to the overall $K_A$ parameter, and is additionally part of the parameter $K_B$ in that $K_B$ is determined by the compliance of the containment chamber generally formed by flexures 110 and 112 and bellows 122. Lastly, damper device 126 is wholly or predominately determinative of the damper constant $C_A$.

The structural implementation of three-parameter vibration isolator 14 described above in conjunction with FIG. 4 is provided by way of non-limiting example only. In further embodiments, axial dampers 14a-14c (FIG. 3) may assume other forms. Commercially-available vibration isolators are commonly packaged as elongated struts, which may be circumferentially positioned around the rotor assembly in a spoke-type arrangement with each strut affixed, for example, between the rotor bearing assembly and the engine case, or in one or more of the manners as shown in FIG. 2 with regard to exemplary vibration isolators 14a-14c.

The various vibration isolation configurations described heretofore may be implemented anisotropically to provide vibration damping across a range of frequencies and for a range of both synchronous and non-synchronous responses. Broadly speaking, the term anisotropic refers to any configuration having properties that differ according to the direction of measurement. Anisotropic vibration isolation may be provided in a variety of forms, including non-equally spaced vibration isolators and non-equally tuned vibration isolators, or various combinations of both.

Figure 5A:
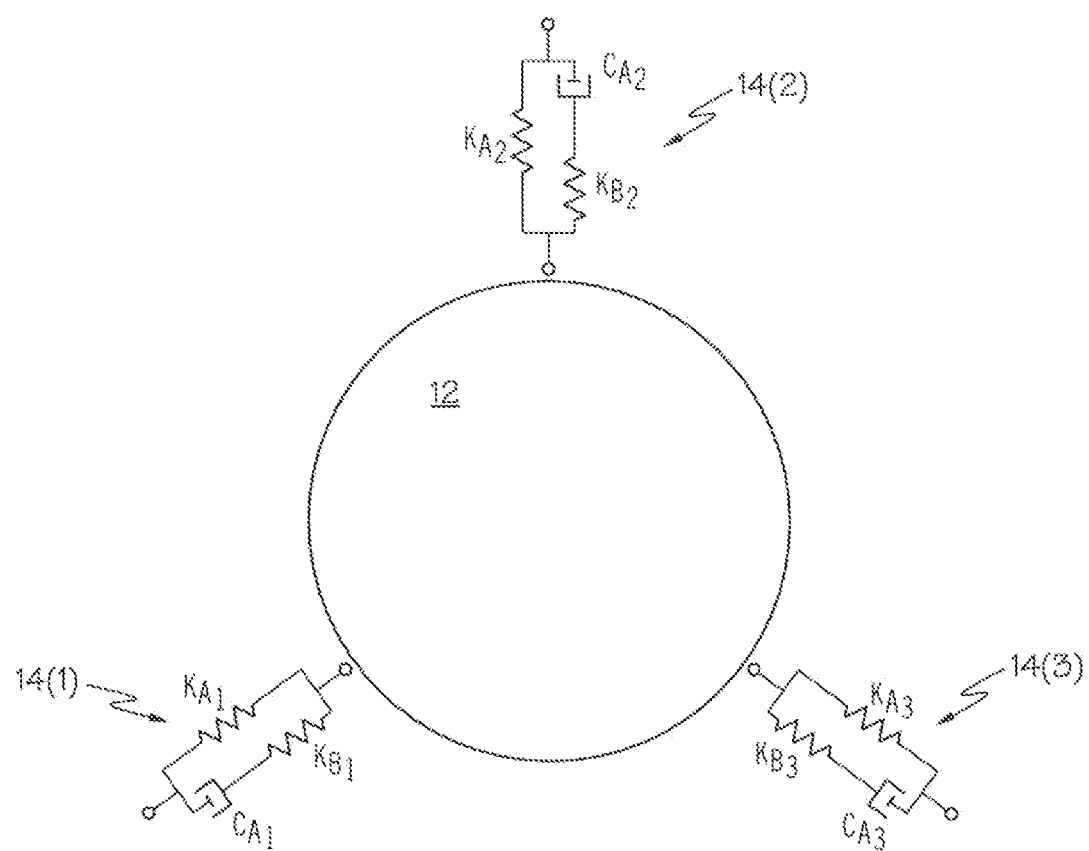
FIGS. 5a, 5b, and 6 are illustrations of anisotropic vibration isolation assemblies in accordance with the present invention.
Figure 5B:
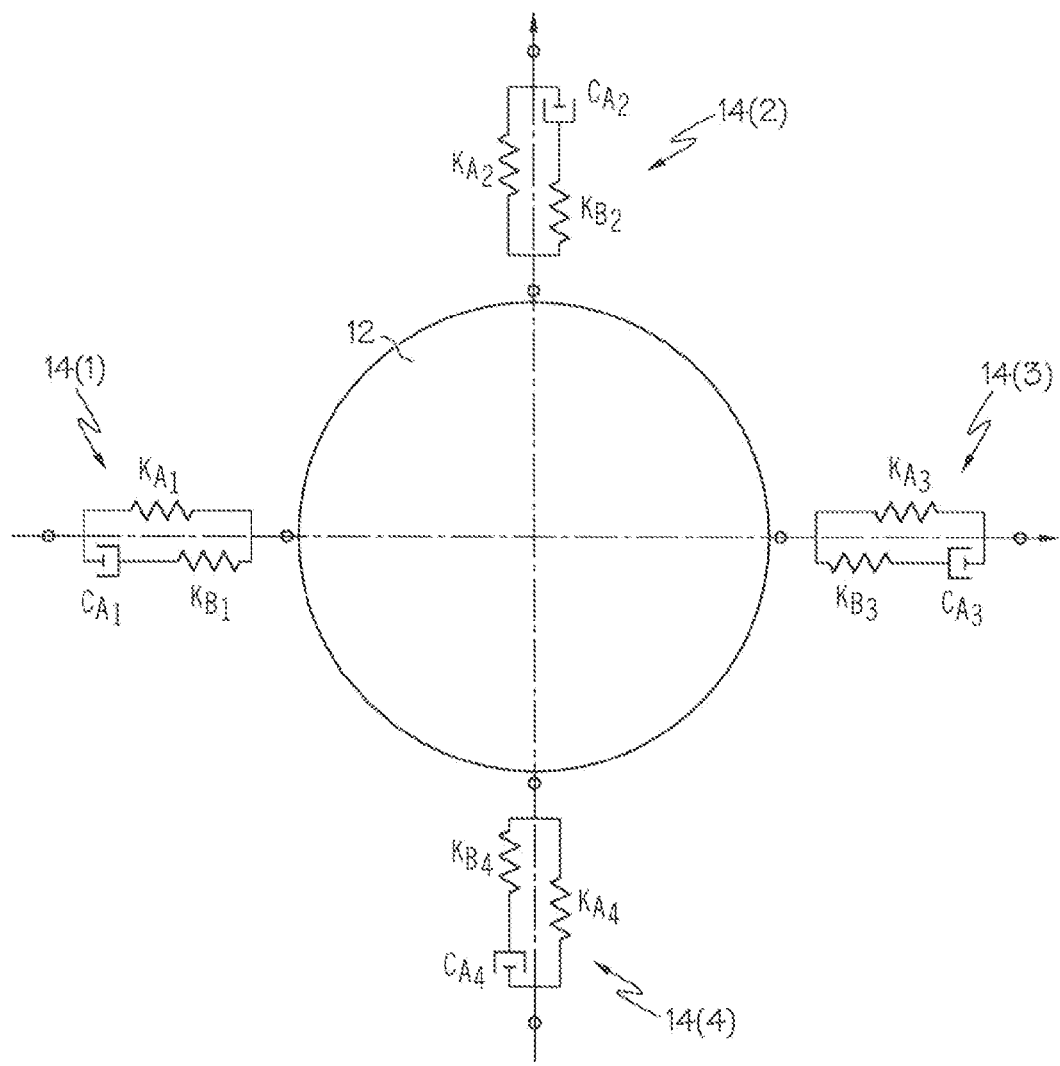

In one embodiment, as shown in FIG. 5a, an anisotropic vibration isolation assembly includes three equally spaced, but non-equally tuned three-parameter vibration isolators 14(1), 14(2), and 14(3). Each of vibration isolations 14(1), 14(2), and 14(3) include parameters $K_A$, $K_B$, and $C_A$, as discussed above. Particularly, vibration isolator 14(1) includes parameters $K_{A1}$, $K_{B1}$, and $C_{A1}$, vibration isolator 14(2) includes parameters $K_{A2}$, $K_{B2}$, and $C_{A2}$, and vibration isolator 14(3) includes parameters $K_{A3}$, $K_{B3}$, and $C_{A3}$. In an isotropic configuration $K_{A1}=K_{A2}=K_{A3}$, $K_{B1}=K_{B2}=K_{B3}$, and $C_{A1}=C_{A2}=C_{A3}$. In an anisotropic configuration, at least one of $K_{A1}$, $K_{A2}$, and $K_{A3}$ are not equal, or at least one of $K_{B1}$, $K_{B2}$, and $K_{B3}$ are not equal, or at least one of $C_{A1}$, $C_{A2}$, and $C_{A3}$ are not equal. FIG. 5b shows a configuration similar to FIG. 5a, but having four equally spaced, non-equally tuned three parameter vibrations isolators 14(1), 14(2), 14(3), and 14(4). In this configuration, vibration isolator 14(4) includes parameters $K_{A4}$, $K_{B4}$, and $C_{A4}$, wherein one or more of such parameters may not equal to any of the other parameters $K_{A1-3}$, $K_{B1-3}$, and $C_{A1-3}$.

Figure 6:
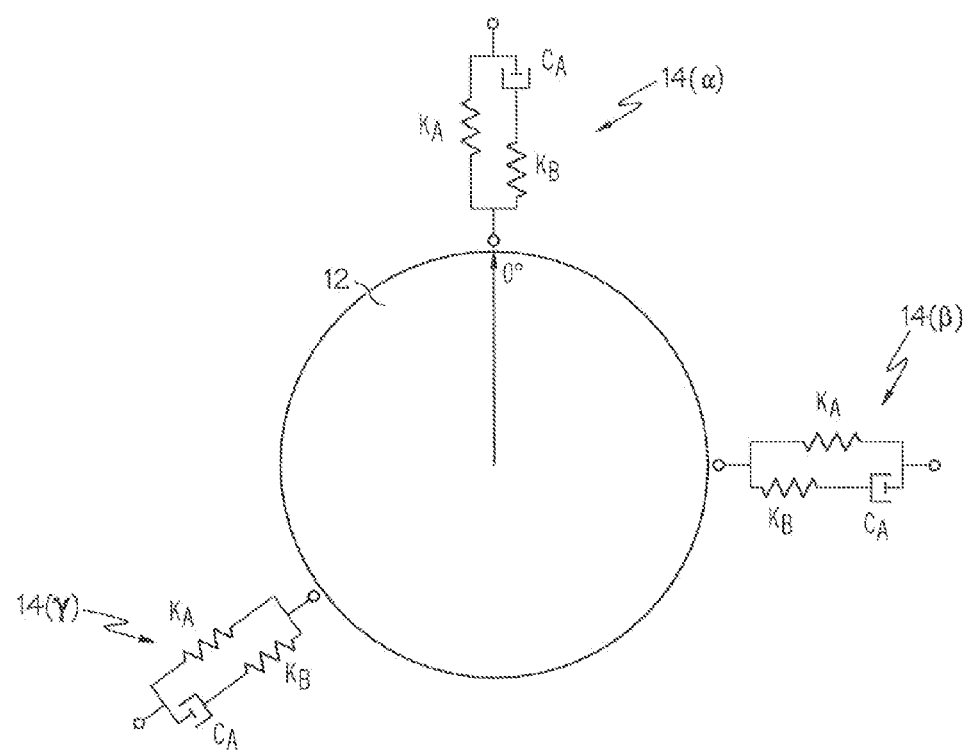

In another embodiment, as shown in FIG. 6, an anisotropic vibration isolation assembly includes three non-equally spaced, but equally tuned three-parameter vibration isolators 14($\alpha$), 14($\beta$), and 14($\gamma$). Each of vibration isolators 14($\alpha$), 14($\beta$), and 14($\gamma$) include the same parameters $K_A$, $K_B$, and $C_A$. However, the spacing between vibration isolators 14($\alpha$), 14($\beta$), and 14($\gamma$), is not constant. With reference to conventional geometric coordinates, the arrow in structural housing member 12 denotes a radial position of 0°. As such, isolator 14($\alpha$) is positioned around the member 12 at approximately angle $\alpha=0°$, isolator 14($\beta$) is positioned around the member 12 at approximately angle $\beta=90°$, and isolator 14($\gamma$) is positioned around the member 12 at approximately angle $\gamma=240°$. As such, the spacing between vibration isolators 14($\alpha$) and 14($\beta$) is approximately 90°, the spacing between vibration isolators 14($\beta$) and 14($\gamma$) is approximately 150°, and the spacing between vibration isolators 14($\gamma$) and 14($\alpha$) is approximately 120°.

Of course, in other embodiments, one, two, three, four, or more three-parameter vibration isolators 14 may be provided as either equally spaced or non-equally spaced, and as having either equal parameters or non-equal parameters, or combinations thereof. In addition, the tuning of the vibration isolator, the strut and the support structures can be considered part of the $K_A$ spring or other portions of various vibrator isolator types. The FIGS. 5a, 5b, and 6 are provided merely as non-limiting examples, and those having ordinary skill in the art will envision other configurations in accordance with the teachings of the present disclosure.

Figure 7:
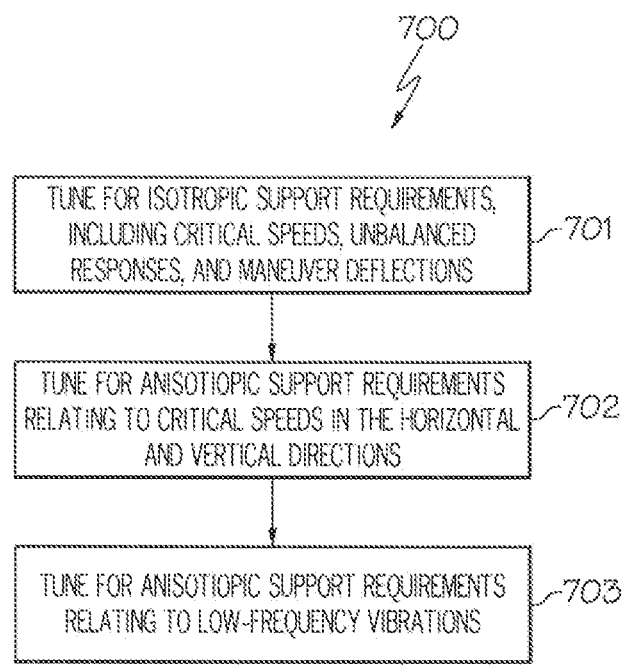
FIG. 7 is a flowchart illustrating an exemplary method 700 for tuning a vibration isolation mounting assembly.

As anisotropic vibration isolation mounting assemblies can be used generally in connection with any machine or apparatus including a rotating member, as discussed above, procedures will be presently described to tune such an assembly for any given implementation. FIG. 7 is a flowchart illustrating an exemplary method 700 for tuning a vibration isolation mounting assembly. At step 701, the assembly is tuned first for isotropic support requirements including, but not limited to, support during critical rotational speeds, support during unbalanced responses, and support during maneuver deflections. For example, a particular implementation may have a known vibration frequency at a critical rotation speed. In another example, a particular implementation may be known to require support at frequently-encountered maneuver deflections, such as turns and altitude increases and decreases using the example of an aircraft. At step 702, the assembly is tuned next for anisotropic support requirements relating to critical speeds that may be encountered in the horizontal and vertical directions. At step 703, the assembly is tuned to reduce known low-frequency vibrations that can cause unpleasant noise in an associated passenger compartment. Other tuning steps can optionally be incorporated to optimize other vibrations that may be known to be encountered, or to enhance the performance and life of the rotating machine to which the assembly is mounted. The term "tuning" as used herein with reference to FIG. 7 can include any one or more of the adjustments and variations to the assembly as discussed above, including varying the number of vibration isolators provided, varying the mounting of the vibration isolators provided, varying the parameters of the vibrations isolators provided (for example, the parameters $K_A$, $K_B$, and $C_A$ in the three-parameter vibration isolators 14 discussed above), and varying the relative spacing of the vibration isolators provided, among other things.

EXAMPLE

Figure 8:
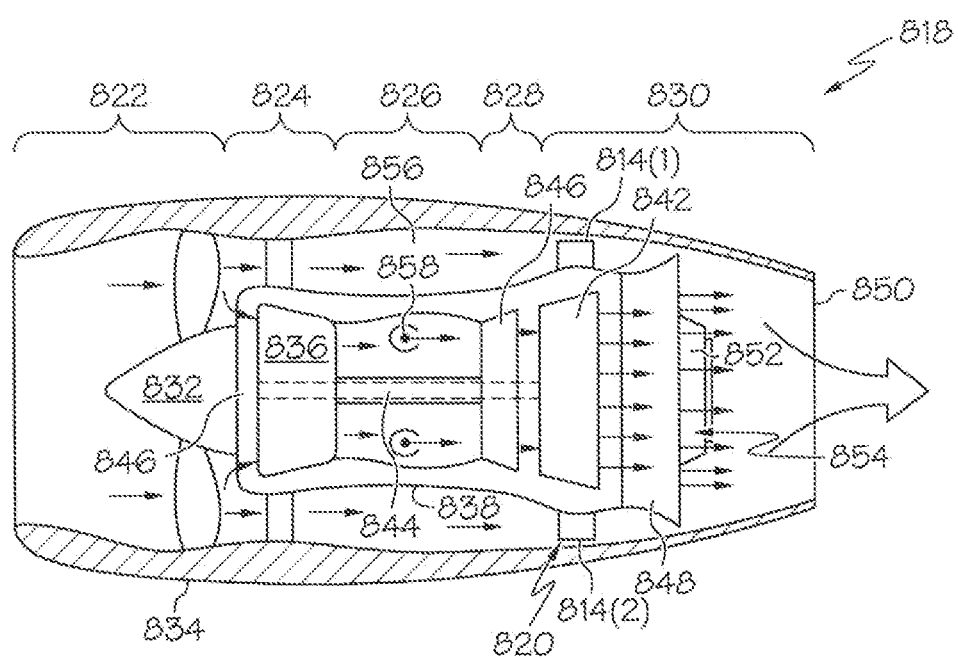
FIG. 8 is an exemplary implementation of an anisotropic vibration isolation mounting assembly in a simplified cross-sectional view of a gas turbine engine (GTE) including an anisotropic vibration isolation mounting assembly.

An exemplary implementation of an anisotropic vibration isolation mounting assembly is depicted in FIG. 8 in a simplified cross-sectional view of a gas turbine engine (GTE) 818 including an anisotropic vibration isolation mounting assembly 820. By way of example, GTE 818 is illustrated in FIG. 8 as a two spool turbofan engine including an intake section 822, a compressor section 824, a combustion section 826, a turbine section 828, and an exhaust section 830. Intake section 822 includes an intake fan 832 mounted in a nacelle assembly 834. In the illustrated example, compressor section 824 includes a single compressor 836, which is rotatably disposed within an engine case 838 mounted within nacelle assembly 834. Turbine section 828 includes a high pressure (HP) turbine 840 and a low pressure (LP) turbine 842, which are rotatably disposed within engine case 38 in flow series. Compressor 836 and HP turbine 840 are mounted to opposing ends of an HP shaft or spool 844, and intake fan 832 and LP turbine 842 are mounted to opposing ends of a LP shaft or spool 46. LP spool 846 and HP spool 844 are co-axial; that is, LP spool 846 extends through a longitudinal channel provided through HP spool 844. Engine case 838 and nacelle assembly 834 terminate in a mixer nozzle 848 and a propulsion nozzle 850, respectively. Mixer nozzle 848 cooperates with a center body 852 to form an exhaust mixer 854, which mixes hot combustive gas flow received from turbine section 828 with cooler bypass airflow during operation of GTE 818.

During operation of GTE 818, air is drawn into intake section 822 and accelerated by intake fan 832. A portion of the accelerated air is directed through a bypass flow passage 856, which is provided between nacelle assembly 834 and engine case 838 and conducts this airflow over and around engine case 838. The remaining portion of air exhausted from intake fan 832 is directed into compressor section 836 and compressed by compressor 836 to raise the temperature and pressure of the core airflow. The hot, compressed airflow is supplied to combustion section 826 wherein the air is mixed with fuel and combusted utilizing one or more combustors 588 included within section 826. The combustive gasses expand rapidly and flow through turbine section 828 to rotate HP turbine 840 and LP turbine 842. The rotation of turbines 840 and 842 drives the rotation of spools 844 and 846, respectively, which, in turn, drives the rotation of compressor 836 and intake fan 832. After flowing through turbine section 828, the combustive gas flow is then directed into exhaust section 830 wherein mixer 854 mixes the combustive gas flow with the cooler bypass air received from bypass flow passages 856. Finally, the combustive gas flow is exhausted from GTE 818 through propulsion nozzle 850 to produce forward thrust.

Due to rotor imbalances, bearing imperfections, de-stabilizing forces, and the like, vibrations are produced during rotation of spools 844 and 846, and transmitted through the non-illustrated rotor bearing assemblies, through engine case 838, and ultimately to the aircraft fuselage. The transmission of vibrations to the fuselage can decrease passenger comfort, detract from engine performance, and limit the operational lifespan of the rotor bearing assemblies and other engine components. Exemplary anisotropic vibration isolation system 820, including two three-parameter vibration isolators 814(1) and 814(2) that are configured anisotropically having different parameter values $K_A$, $K_B$, and $C_A$, is provided for reducing the magnitude of vibrations of the rotor system, as well as the vibratory forces transmitted from the rotor assembly to engine case 838.

In so doing, anisotropic vibration isolation assembly 820 is able to provide highly effective vibration attenuation through multiple rotor critical modes distributed across the frequency range of the rotor assembly during operation of GTE 818. As a further advantage, assembly 820 provides a highly-tunable stiffness profile. As a result, assembly 820 can be tuned to provide static and dynamic stiffnesses to improve rotor centerline control and thereby improve the overall efficiency of GTE 818, and to reduce low-frequency vibrations that may cause unpleasant cabin noise in an associated aircraft. While this example is described in conjunction with a gas turbine engine, it is emphasized that embodiments of assembly 820 can be utilized in conjunction with other types of rotating machinery.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An anisotropic vibration isolation mounting assembly that is mounted on and provides vibration isolation to a rotating machine, wherein the rotating machine is selected from the group consisting of: a gas turbine engine, a spacecraft navigational component, a pump, a turbocharger, and a generator, the rotating machine comprising a rotating member assembly that rotates about an axis of rotation, a rotating member assembly housing, and a system interface member, the vibration isolation mounting assembly comprising:

at least three three-parameter vibration isolators that each comprise a first spring element that is mechanically configured in parallel with a second spring element that is mechanically configured in series with a damper element, each three-parameter vibration isolator having a first end and a second end, wherein each first end is attached to the rotating member assembly or the rotating member assembly housing, each second end is attached to the rotating member assembly housing when the first end is attached to the rotating member assembly or to the system interface member when the first end is attached to the rotating member assembly housing, and further wherein the at least three three-parameter vibration isolators are tuned anisotropically to minimize transmission of vibrations during operation of the rotating machine, wherein anisotropic tuning comprises 1) the at least three three-parameter vibration isolators are unequally spaced circumferentially about the rotating member assembly or the rotating member assembly housing such that at least one of the vibration isolators is differently spaced circumferentially with respect to its nearest two neighboring vibration isolators, or 2) the tuning parameters of one of the first spring element, the second spring element, or the damper element of one of the at least three three-parameter vibration isolators differ from the tuning parameters of a respective one of the first spring element, the second spring element, or the damper element of another one of the at least three three-parameter vibration isolators, wherein the at least three three-parameter vibration isolators cooperate to anisotropically minimize transmission of vibrations by damping vibrations in accordance with a first tuning in a first axis and in accordance with a second tuning in a second axis, the first tuning being different from the second tuning, each of the first and second axes being orthogonal to the axis of rotation, and each of the first and second axes being orthogonal to one another, and wherein the at least three three-parameter vibration isolators at different radial elevations with respect to the rotating member assembly, such that at least a first vibration isolator is located radially-outward from the rotating member assembly with respect to at least a second vibration isolator, the at least a second vibration isolator being circumferentially off-set from the at least a first vibration isolator.

2. The anisotropic vibration isolation mounting assembly of claim 1, wherein one of the at least three three-parameter vibration isolators has the first end thereof configured for attachment to the rotating member assembly and the second end thereof configured for attachment to the rotating member assembly housing, and wherein another of the at least three three-parameter vibration isolators has the first end thereof configured for attachment to the rotating member assembly housing and the second end thereof configured for attachment to the system interface member.

3. The anisotropic vibration is isolation mounting assembly of claim 1, wherein each of the at least three three-parameter vibration isolators comprises a mounting portion and a strut portion.

4. The anisotropic vibration isolation mounting assembly of claim 1, wherein the at least three three-parameter vibration isolators are mounted at non-equal circumferential distances from one another circumferentially about the rotating machine at the same axial position with respect to the axis of rotation.

5. The anisotropic vibration isolation mounting assembly of claim 4, wherein one of the at least three three-parameter vibration isolators is configured having vibration damping parameters that differ from at least one other of the at least three three-parameter vibration isolators.

6. The anisotropic vibration isolation mounting assembly of claim 1, wherein one of the at least three three-parameter vibration isolators is configured having vibration damping parameters that differ from at least one other of the at least three three-parameter vibration isolators.

7. The anisotropic vibration isolation mounting assembly of claim 1, wherein the at least three three-parameter vibration isolators are tuned anisotropically to minimize the transmission of low-frequency vibrations during operation of rotating machine.

8. The anisotropic vibration isolation mounting assembly of claim 1, wherein the at least three three-parameter vibration isolators are tuned anisotropically to minimize the transmission of critical speed-induced vibrations during operation of rotating machine.

9. The anisotropic vibration isolation mounting assembly of claim 1, wherein the at least three three-parameter vibration isolators are tuned anisotropically to minimize the transmission of maneuver deflection-induced vibrations during operation of rotating machine.

10. A gas turbine engine assembly configured to be mounted to an airframe, the gas turbine engine assembly comprising:

a gas turbine engine, the gas turbine engine comprising a rotor bearing assembly that rotates about an axis of rotation, a rotor bearing housing, and an engine casing; and at least three three-parameter vibration isolators that each comprise a first spring element that is mechanically configured in parallel with a second spring element that is mechanically configured in series with a damper element, each three-parameter vibration isolator having a first end and a second end, each first end is attached to the rotor bearing assembly or the rotor bearing housing, each second end is attached to the rotor bearing housing when the first end is attached to the rotor bearing assembly or to the engine casing when the first end is attached to the rotor bearing housing, the at least three three-parameter vibration isolators tuned anisotropically to minimize transmission of vibrations from the gas turbine engine to the airframe during operation of the gas turbine engine, wherein anisotropic tuning comprises 1) the at least three three-parameter vibration isolators are unequally spaced circumferentially about the rotor bearing assembly or the rotor bearing assembly housing such that at least one of the vibration isolators is differently spaced circumferentially with respect to its nearest two neighboring vibration isolators, or 2) the tuning parameters of one of the first spring element, the second spring element, or the damper element of one of the at least three three-parameter vibration isolators differ from the tuning parameters of a respective one of the first spring element, the second spring element, or the damper element of another one of the at least three three-parameter vibration isolators, wherein the at least three three-parameter vibration isolators cooperate to anisotropically minimize transmission of vibrations by damping vibrations in accordance with a first tuning in a first axis and in accordance with a second tuning in a second axis, the first tuning being different from the second tuning, each of the first and second axes being orthogonal to the axis of rotation, and each of the first and second axes being orthogonal to one another, and wherein the at least three three-parameter vibration isolators at different radial elevations with respect to the rotating bearing assembly, such that at least a first vibration isolator is located radially-outward from the rotating bearing assembly with respect to at least a second vibration isolator, the at least a second vibration isolator being circumferentially off-set from the at least a first vibration isolator.

11. The gas turbine engine assembly of claim 10, comprising at least four three-parameter vibration isolators.

12. The gas turbine engine assembly of claim 10, wherein each of the at least three three-parameter vibration isolators comprises a strut portion and a mounting portion.

13. The gas turbine engine assembly of claim 12, wherein the strut portion comprises a first spring element in parallel with a damping element and a second spring element, the damping element and the second spring element being in series with one another.

14. The gas turbine engine assembly of claim 13, wherein one of the at least three three-parameter vibration isolators is configured having vibration damping parameters that differ from at least one other of the at least three three-parameter vibration isolators.

15. The gas turbine engine assembly of claim 10, wherein the at least three three-parameter vibration isolators are tuned anisotropically to minimize the transmission of one or more of: low-frequency vibrations, critical speed-induced vibrations, and maneuver deflection-induced vibrations during operation of the gas turbine engine.

16. A method for producing an anisotropic vibration isolation mounting assembly for mounting on and providing vibration isolation to a rotating machine, wherein the rotating machine is selected from the group consisting of: a gas turbine engine, a spacecraft navigational component, a pump, a turbocharger, and a generator, the rotating machine comprising a rotating member assembly that rotates about an axis of rotation, a rotating member assembly housing, and a system interface member, the method comprising:

providing the rotating machine, wherein the rotating machine has operational characteristics;

attaching a plurality of three-parameter vibration isolators that each comprise a first spring element that is mechanically configured in parallel with a second spring element that is mechanically configured in series with a damper element to the rotating machine at different circumferential locations circumferentially about the rotating machine; and independently and anisotropically tuning each one of the plurality of three-parameter vibration isolators to impart vibration isolation to the rotating machine based upon the operational characteristics of the rotating machine, wherein independent and anisotropic tuning comprises 1) the at least three three-parameter vibration isolators are unequally spaced circumferentially about the rotating member assembly or the rotating member assembly housing such that at least one of the vibration isolators is differently spaced circumferentially with respect to its nearest two neighboring vibration isolators, or 2) the tuning parameters of one of the first spring element, the second spring element, or the damper element of one of the at least three three-parameter vibration isolators differ from the tuning parameters of a respective one of the first spring element, the second spring element, or the damper element of another one of the at least three three-parameter vibration isolators, and wherein independently and anisotropically tuning comprises tuning such that each one of the plurality of three three-parameter vibration isolators cooperate to anisotropically minimize transmission of vibrations by damping vibrations in accordance with a first tuning in a first axis and in accordance with a second tuning in a second axis, the first tuning being different from the second tuning, each of the first and second axes being orthogonal to the axis of rotation, and each of the first and second axes being orthogonal to one another and, wherein the at least three three-parameter vibration isolators at different radial elevations with respect to the rotating member assembly, such that at least a first vibration isolator is located radially-outward from the rotating member assembly with respect to at least a second vibration isolator, the at least a second vibration isolator being circumferentially off-set from the at least a first vibration isolator.

17. The method of claim 16, wherein independently and anisotropically tuning comprises attaching the plurality of three-parameter vibration isolators circumferentially at an unequal circumferential spacing about the rotating machine but at the same axial position with respect to the axis of rotation, each of the plurality of three-parameter vibration isolators comprising the same damping parameters.

18. The method of claim 16, wherein independently and anisotropically tuning comprises attaching the plurality of three-parameter vibration isolators circumferentially at an equal circumferential spacing about the rotating machine and at the same axial position with respect to the axis of rotation, at least one vibration isolator of the plurality of three-parameter vibration isolators comprising damping parameters that differ from at least one other vibration isolator of the plurality of three parameter vibration isolators.

* * * * *